United States Patent

Adams et al.

[11] Patent Number: 5,857,118
[45] Date of Patent: Jan. 5, 1999

[54] SHARED VIDEO DISPLAY IN A MULTIPLE PROCESSOR COMPUTER SYSTEM

[75] Inventors: Dale R. Adams, San Jose; David C. Buuck, Santa Clara; Paul Thompson, Sunnyvale; David Townsley, Cupertino, all of Calif.

[73] Assignee: Apple Computer, Inc., Cupertino, Calif.

[21] Appl. No.: 751,289

[22] Filed: Nov. 18, 1996

Related U.S. Application Data

[63] Continuation of Ser. No. 690,357, Jul. 26, 1996, abandoned, which is a continuation of Ser. No. 557,804, Nov. 14, 1995, abandoned, which is a continuation of Ser. No. 511,188, Aug. 4, 1995, abandoned.

[51] Int. Cl.[6] ............................................. G09G 5/00
[52] U.S. Cl. ........................ 395/892; 345/29; 345/520; 348/705
[58] Field of Search ............................. 345/4, 9, 10, 12, 345/13, 19, 29; 348/47, 705, 706; 395/502, 520, 526, 501, 892; 326/30; 333/17.3, 18, 124, 130

[56] References Cited

U.S. PATENT DOCUMENTS

| | | | |
|---|---|---|---|
| 3,710,282 | 1/1973 | Seinecke | 333/130 |
| 3,900,705 | 8/1975 | Richeter | 348/159 |
| 4,581,644 | 4/1986 | Deiss | 348/705 |
| 4,837,623 | 6/1989 | Motoyama | 358/165 |
| 4,922,449 | 5/1990 | Donalson et al. | 395/280 |
| 5,258,655 | 11/1993 | May et al. | 307/139 |
| 5,373,310 | 12/1994 | Ichimura et al. | 365/197 |
| 5,448,591 | 9/1995 | Goodrich | 375/257 |
| 5,541,535 | 7/1996 | Cao et al. | 326/83 |
| 5,548,226 | 8/1996 | Takekuma et al. | 326/30 |
| 5,550,566 | 8/1996 | Hodgson et al. | 345/202 |
| 5,559,441 | 9/1996 | Desroches | 324/647 |
| 5,565,896 | 10/1996 | Suski | 345/211 |

*Primary Examiner*—Dung C. Dinh
*Attorney, Agent, or Firm*—Burns, Doane, Swecker & Mathis, L.L.P.

[57] ABSTRACT

A computer system having at least two subsystems which generate video signals and which share the same video display terminal. Provision is made to allow disabling of the current output of each system and controlling line reflections.

14 Claims, 3 Drawing Sheets

SHARED VIDEO DISPLAY IN A MULTIPLE PROCESSOR COMPUTER SYSTEM

RELATED APPLICATIONS

This application is a continuation of U.S. patent application Ser. No. 08/690,357, filed Jul. 26, 1996, which is a continuation of Ser. No. 08/557,804, filed Nov. 14, 1995, which is a continuation of U.S. patent application Ser. No. 08/511,188, filed Aug. 4,1995, all of which are now abandoned.

BACKGROUND

This invention relates to a system for permitting multiple microprocessors to share the same video display, and, more particularly, for sharing the same display in such a way that video performance is not compromised.

Most conventional personal computer systems have a single microprocessor. In some circumstances, however, it may be advantageous to have one or more additional microprocessors additionally integrated into the system. For example, if the primary system processor is a 60x (e.g., 601, 603, 604) microprocessor, it may be desirable also to include a DOS-based microprocessor such as an Intel 486 or Pentium microprocessor as an auxiliary processor to enable the system to run DOS programs.

A conventional system for achieving this end is shown in FIG. 1. As shown, the system 10 of FIG. 1 includes a primary microprocessor 20 and an auxiliary microprocessor 30. The primary microprocessor 20 may be on a motherboard such as motherboard 25 and the auxiliary processor 30 on an expansion card 40, although other arrangements are possible. Either or both processors may be 60x series processors, x86 type processors, or any other suitable type of microprocessor.

It is advantageous in such a system for the microprocessors to share system resources such as power supplies, I/O devices such the keyboard and disk drives, and output devices such as a monitor and printer. In the system 10 shown the microprocessors share a monitor 50. To do this, each microprocessor generates its own set of digital video signals which are conveyed to a respective digital to analog converter (DAC), that is, a DAC1 60 for the primary microprocessor 20 and a DAC2 70 for the auxiliary microprocessor 30. The respective analog video outputs of the DAC1 60 and the DAC2 70 are connected to respective video out connectors 65 and 75, and then summed at a video summing junction B. The interconnection of the video out connectors 65 and 75 to the summing junction B, and the connection of the summing junction B to the monitor 50, is accomplished by an external wiring harness 90.

Conventionally, a DAC such as either DAC1 60 and DAC2 70 which converts digital video into analog video is placed close to the external video out connector 80. This has the disadvantage that conveying the digital video signal from the DAC to the connector across the PCB can cause electromagnetic interference (EMI). It also has the disadvantage that it necessitates running a parallel digital signal across the board, which can require 32 or even 64 traces.

In a system 10 such as that shown, it is also possible to have significant signal reflection in the lines carrying the analog video signal. In effect, each DAC launches a forward-going wave toward the connectors 65 and 75 and the monitor 50. The wave encounters an impedance discontinuity when it reaches these elements. At the discontinuity, part of the wave's energy will be transmitted, but another part will be reflected. In a line which is assumed to be lossless, the magnitude of the reflected signal or wave is determined by the magnitude of the incident signal multiplied by a reflection coefficient which depends in turn on the magnitude of the difference between the line impedance and the load impedance. Ideally, if the line impedance equals the load impedance, then the impedances are matched, the reflection coefficient is zero, and there is no reflected signal. In practice, however, there is an intrinsic mismatch, so that reflections are created.

These reflections or return waves if not controlled or eliminated will distort forward-going signals in the line. For example, the theoretical ideal primary color waveforms for a linescan of a standard color-bar chart are shown in FIG. 2. These waveforms are taken from J. Fisher et al., "Waveforms and Spectra of Composite Video Signals", *Television Engineering Handbook,* p. 5.24 (McGraw-Hill Book Co. 1986). These waveforms are for the line scan of a chart having colors in the order of red, yellow, green, cyan, gray, magenta, blue, white, and black. The amplitude of the signal in each channel ($R'_R$, $E'_G$, and $E'_B$) of the composite video signal is determined by the amount of the corresponding color in the scanned image, and will in turn determine the amount of that color in a video reproduction of that image. Reflections cause spurious "structure" (deviations from true signal levels) in each channel in the composite video signal. This structure may take the form of a stepwise increase or decrease in a signal ("shelving") which should be increasing or decreasing nearly instantaneously. The signal at a given point is in effect the superposition of the forward-going wave and the reflected return signal. This superposition obscures the data in the forward-going signal, thus distorting the color in the video image.

SUMMARY

The present invention resides in the provision of a system for permitting multiple data sources such as microprocessors to share system resources. In one aspect, the system includes a first source of analog signals which includes a first source of digital signals for producing a first digital signal and a first digital-to-analog converter for converting the first digital signal to a first analog signal. The system also detects a presence of a second source of analog signals, and has means for permitting a current output of the first digital-to-analog converter to be disabled if the presence of the second source of analog signals is detected.

In another aspect, the invention is a computer system comprising a first subsystem including a first source of digital signals including a first microprocessor for producing a first digital signal and a first digital-to-analog converter for converting the first digital signal to a first analog signal. The computer system also includes a second subsystem made up at least in part of a second source of digital signals including a second microprocessor for producing a second digital signal and a second digital-to-analog converter for converting the second digital signal to a second analog signal. The computer system also includes an external video out connector arranged to receive the first analog signal and the second analog signal. A first signal path between the first digital-to-analog converter and the external video connector is substantially longer than a signal path between the first digital-to-analog converter and the first source of digital signals. A second signal path between the second digital-to-analog converter and the external video connector may also be substantially longer than a signal path between the second digital-to-analog converter and the second source of digital signals.

The system may also include an impedance compensator interposed in the first signal path closer to the external video connector than to the first digital-to-analog converter for altering the impedance of the first signal path to abate signal reflections. Also, a connector may be interposed in the second signal path closer to the external video connector than to the second digital-to-analog converter for connecting the second signal path to the first signal path at a summing junction so that the first and second signal paths are merged between the summing junction and the external video connector. The connector may be configured to make it possible to disable the current output of the first digital-to-analog converter in response to a detection that the second source of digital video signals is present in the system. The system may also include an interface module interposed in the second signal path between the second digital-to-analog converter and the connector for translating the second analog signal so the second analog signal can be summed at the summing junction without significant degradation.

A system according to the invention thus makes it possible to place all of the intersystem connections inside the computer chassis, thus eliminating the wiring harness of a conventional system. This has the attendant advantages of being less expensive and less prone to emit interfering electromagnetic waves.

DETAILED DESCRIPTION

Figure 1:
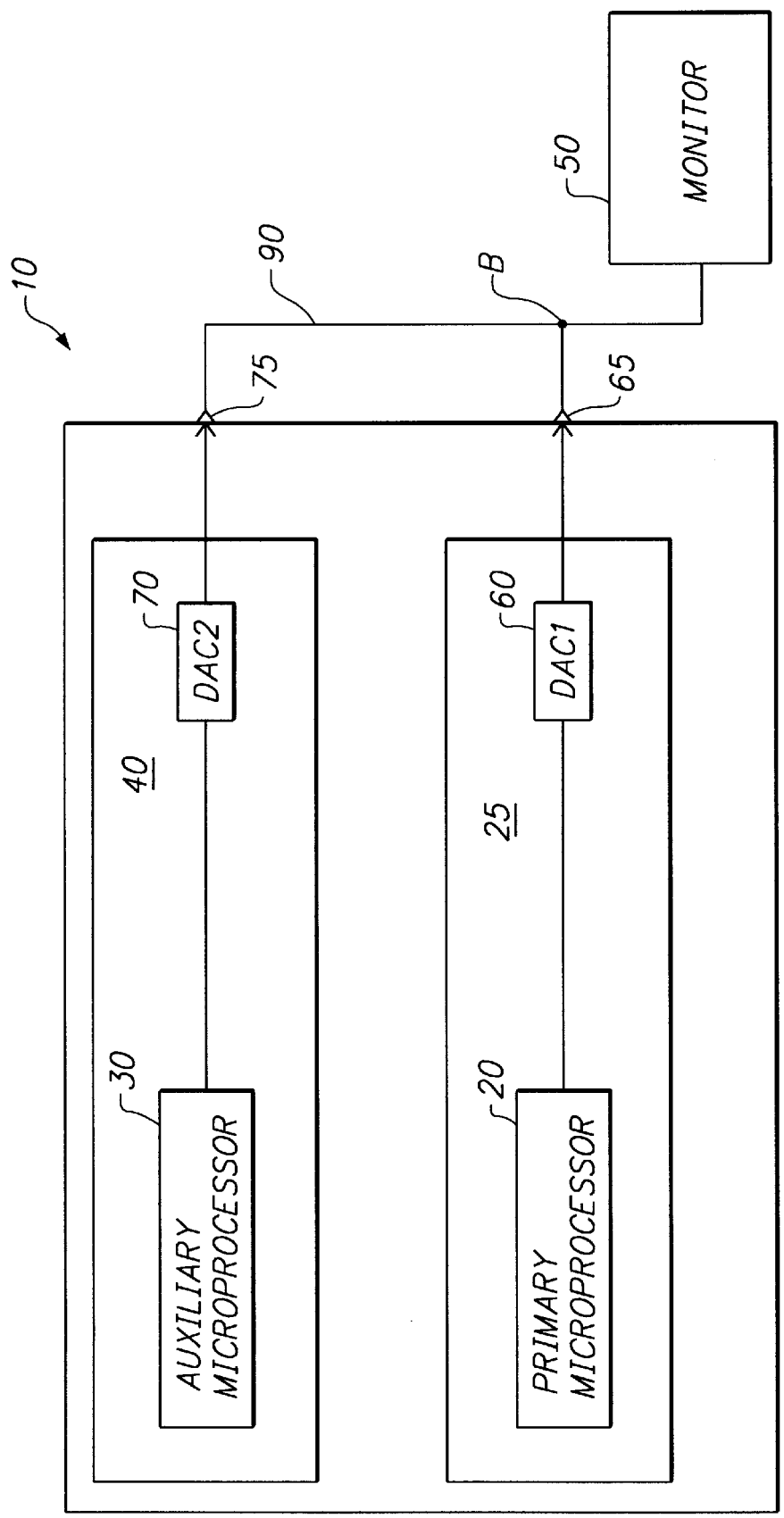
FIG. 1 is a functional block diagram of a conventional arrangement for a system having two microprocessor subsystems sharing a common video display terminal.
Figure 2:
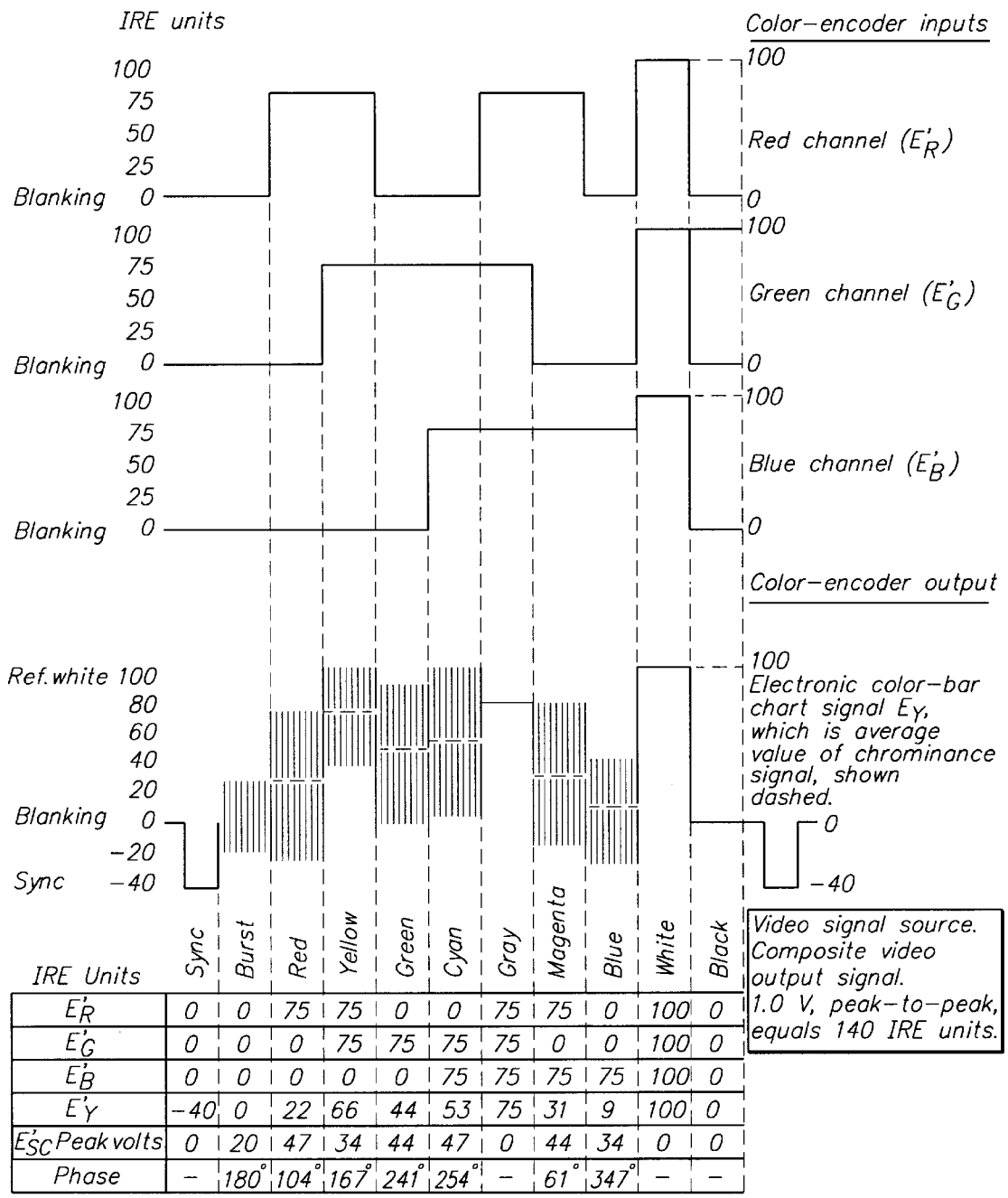
FIG. 2 is a diagram of waveforms resulting from the linescan of a standard color-bar-chart.
Figure 3:
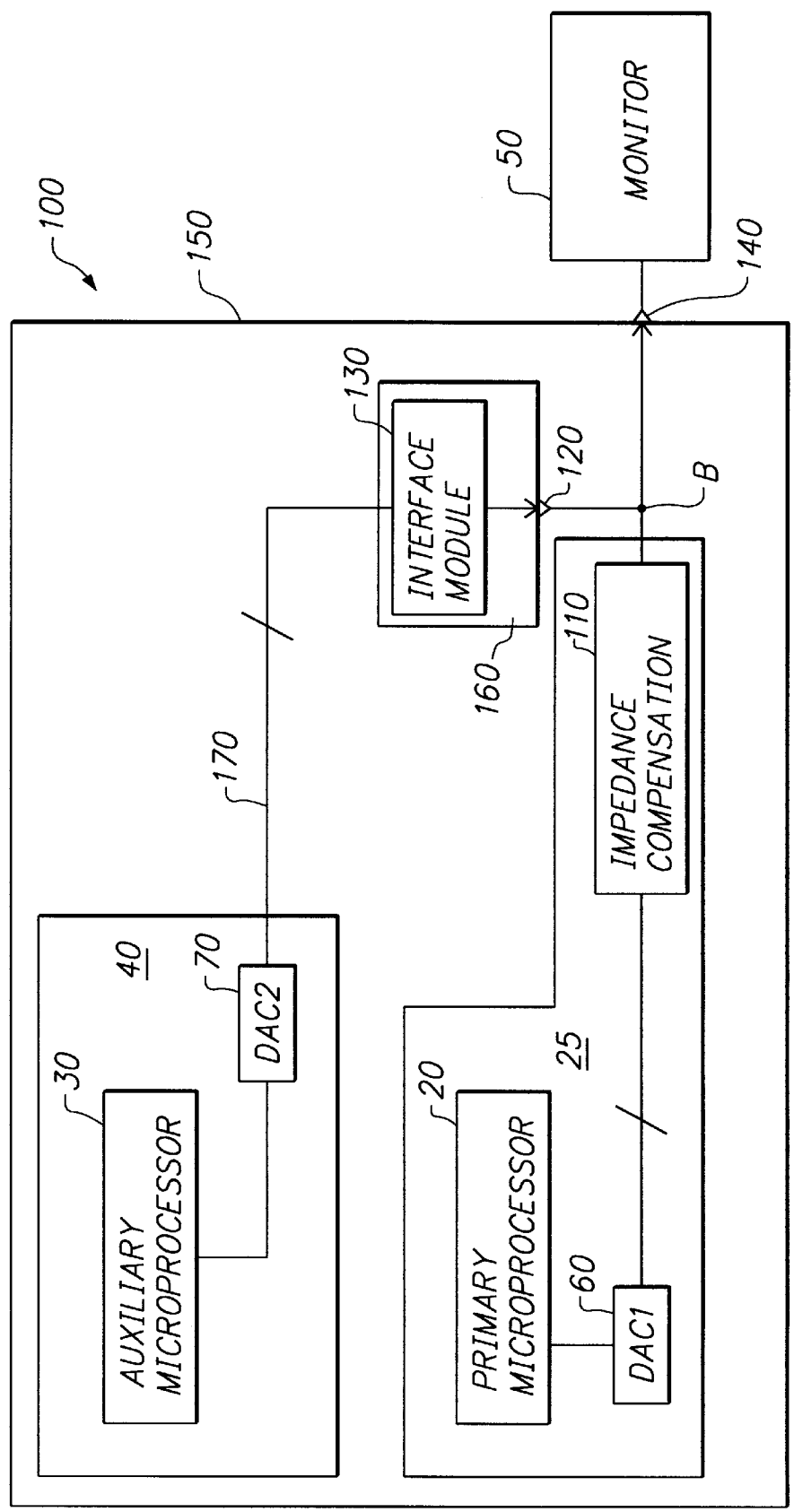
FIG. 3 is a functional block diagram of an arrangement for a system having two microprocessor subsystems sharing a common video display terminal according to a presently preferred embodiment of the invention.

A presently preferred embodiment of the a computer system 100 according to the invention is shown in FIG. 3. As in system 10, the system 100 of FIG. 3 includes a primary microprocessor 20 and an auxiliary microprocessor 30. The primary microprocessor 20 may be on a motherboard 25 and the auxiliary processor 30 on an expansion card 40, although other arrangements are possible. Either or both processors may be 60x series processors, x86 type processors, or any other suitable type of microprocessor.

The microprocessors in system 100 share a monitor 50. To do this, each microprocessor generates digital video signals which are conveyed to a respective DAC, DAC1 60 for the primary microprocessor 20 and a DAC2 70 for the auxiliary microprocessor 30. Each DAC converts the digital video from its respective microprocessor and converts it to a wideband analog (RGB) video signal.

In a system according to the invention, the DACs are placed near the memory subsystem. This makes the memory/DAC interface short, which promotes EMI abatement and also reduces the number of traces which need to run across the length of the board. Conductive traces on the motherboard 25 holding the memory subsystem and the DAC1 60 carry the wideband analog video signal from the DAC1 60 across the PCB to a shared external video out connector the connector 140. Thus, the microprocessor subsystem connections all occur within the computer chassis 150, promoting EMI abatement.

One aspect of the invention is that an analog signal is conveyed across a substantial portion of the PCB. As opposed to a digital signal, in which voltage levels need only stay within ranges recognizable as logical "0" or "1", the signal level in real time in an analog signal convey the information. This makes the time response of the line carrying the signal more critical, including its settling time, that is, the time required for the output to reach and remain within a specified percentage, usually 2 or 5%, of its final value in response to a step input. Reflection performance also becomes more critical.

As this is the case, it is preferred that the trace carrying the analog video signal be isolated to prevent it from radiating into adjacent traces, and to prevent adjacent traces from radiating into it. A presently preferred arrangement for isolating a trace is disclosed in U.S. patent application Ser. No. 08/511,186, entitled "Arrangement for Isolating a Conductor From Stray Electromagnetic Energy", naming David C. Buuck as an inventor, filed on Aug. 4, 1995 and commonly assigned.

It is also important that the transmission occur in a controlled impedance environment since failure to control impedance will cause reflections on the lines carrying the analog video signal including the cable to the monitor. This in turn causes a significant degradation in picture quality at the monitor, which is immediately apparent to the user. In particular, in the embodiment shown, an impedance compensation element 110 is used to modify the line impedance. In a presently preferred embodiment, the impedance compensation element is a series resistor. The position of the resistor and its value are selected to minimize reflections. This can be done using a simulator or empirically. For a configuration such as that shown, where the DAC1 60 desirably outputs into a 75 ohm load and the line impedance is about 50 ohms, a resistor having a value of about 25 ohms positioned as close as is practical to the connector 140 has been found to render the best results. It will be noted that this value is roughly the difference between the DAC1 60 optimal output load and the line impedance. In fact, since the value of the line impedance may vary board-to-board because it is a function of parameters such as trace width, intertrace distance, distance to a conductive reference plane, and so on which may vary, it has been determined that it is better in practice to select a value for the resistor which is slightly lower than 25 ohms, say, 19 ohms, to allow for variation in line impedance.

It should also be noted that there are in actuality at three (RGB) analog lines running between DAC1 and the connector 140, and that a similar impedance compensation element 110 would be placed in each.

The subsystem including the auxiliary microprocessor 30 is connected to external video out connector 80 through a subsystem connector 120 and an interface module 130. The board 40 on which this subsystem my reside may fit into an expansion slot. The overall system can determine when the board 40 is present and can in response allow the current output of DAC1 60 to be disabled so that only one of DAC1 and DAC2 has an enabled current output. The interface module 130 may be positioned on a PCB 160 which is separate from the expansion board 40. The output of the DAC2 70 may then be coupled to the interface module 130 by a cable or the like 170.

Also, the arrangement and placement of the transmission lines and connectors allows for reflection-free video performance. One measure to eliminate the return wave is to place the connector 120 and the interface module 130 physically proximate to one another on the small PCB 160. This eliminates the generation of reflections in the disabled line. As a second measure, the interface module 130 translates the output of DAC2 in such a manner that current can be summed at node B without degrading signals. To accomplish this, a current mirror may be used as the interface module.

Switching between DACs will be accomplished by a user, typically by keyboard input using a hotkey combination. The system 100 intercepts the hotkey input and interprets it as a command to switch from the then current processor domain to the other processor domain. The system turns off (disables) the then active DAC and turns on (enables) the other DAC. Ideally, the process occurs in background and is not perceptible to the user.

It is also necessary or desirable that the systems share additional video resources. For example, in the foregoing arrangement it is additionally necessary to design the memory controller to interface with both processor domains. Specifically, the memory controller must operate in a "wired or" configuration where it can shut off one set of synchronization signals so that only one set is active at a time. Also, to use the specific example of a DOS card running in a Macintosh environment, any time the DOS portion of the system is active the Macintosh video system has to acknowledge and accept the DOS video signals. In essence, the DOS video needs to have control over at least a portion of the Macintosh frame buffer, that is, to have at least a portion of the frame buffer allocated to it.

The foregoing describes the invention in terms of specific arrangements purely to elucidate its principles. It will be apparent to one having ordinary skill in the art that the invention can be embodied in other arrangements without departing from its fundamental principles. The invention should therefore not be regarded as limited to the described arrangements but instead by fully commensurate in scope with the following claims.

What is claimed is:

1. Apparatus comprising:
    a first source of analog display signals including
        a first source of digital signals for producing a first digital signal and
        A first digital-to-analog converter for converting said first digital signal to a first analog signal;
    means for detecting a presence of a second source of analog display signals; means for permitting a current output of the first digital-to-analog converter to be disabled if said detector detects the presence of said second source of analog signals; and
    means for dynamically changing contents of a display image produced in response to said first source of analog display signals.

2. Apparatus as claimed in claim 1 wherein said first source of digital signals for producing a first digital signal comprises a first microprocessor.

3. Apparatus as claimed in claim 2 wherein said means for detecting a presence of a second source of analog signals and said means for permitting a current output of the first digital-to-analog converter to be disabled comprises said first microprocessor.

4. The apparatus of claim 1 further comprising user input means, wherein said means for detecting detects presence of a second source of analog display signals in response to a signal from said user input means.

5. A computer system comprising:
    a first subsystem including
        a first source of digital signals including a first microprocessor for producing a first digital signal and
        a first digital-to-analog converter for converting said first digital signal to a first analog signal;
    a second subsystem including
        a second source of digital signals including a second microprocessor for producing a second digital signal and
        a second digital-to-analog converter for converting said second digital signal to a second analog signal; and
    an external video out connector arranged to receive said first analog signal and said second analog signal,
    wherein a first signal path between said first digital-to-analog converter and said external video connector is substantially longer than a signal path between said first digital-to-analog converter and said first source of digital signals.

6. A computer system as claimed in claim 5 wherein a second signal path between said second digital-to-analog converter and said external video connector is substantially longer than a signal path between said second digital-to-analog converter and said second source of digital signals.

7. A computer system as claimed in claim 5 further comprising an impedance compensation element interposed in said first signal path closer to said external video connector than to said first digital-to-analog converter for altering the impedance of said first signal path to abate signal reflections.

8. A computer system as claimed in claim 7 wherein said impedance compensation element comprises a resistor.

9. A computer system as claimed in claim 8 wherein said resistor is positioned in said first signal path close to said external video connector.

10. A computer system as claimed in claim 9 wherein a value of said resistor is chosen to be about equal to a difference between an output impedance of said first digital-to-analog converter and a line impedance of said first signal path.

11. A computer system as claimed in claim 9 wherein said resistor has a value in the range from 19 ohms to 25 ohms, inclusively.

12. A computer system as claimed in claim 5 further comprising a connector interposed in said second signal path closer to said external video connector than to said second digital-to-analog converter for connecting said second signal path to said first signal path at a summing junction so that said first and second signal paths are merged between said summing junction and said external video connector.

13. A computer system as claimed in claim 12 further comprising an interface module interposed in said second signal path between said second digital-to-analog converter and said connector for translating said second analog signal so said second analog signal can be summed at said summing junction without significant degradation.

14. A computer system as claimed in claim 13 wherein said interface module is positioned in said second signal path close to said connector.

* * * * *